United States Patent
Stoelinga

(10) Patent No.: US 8,117,931 B2
(45) Date of Patent: Feb. 21, 2012

(54) DRIVE FOR DISPLACING PROFILE PARTS RELATIVE TO EACH OTHER VIA A FLEXIBLE MATERIAL STRIP, LENGTH-ADJUSTABLE HOUSING AND ARTICLE OF FURNITURE

(75) Inventor: Dirk Jan Stoelinga, Bunschoten (NL)

(73) Assignee: Actiforce International B.V., Blaricom (NL)

( * ) Notice: Subject to any disclaimer, the term of this patent is extended or adjusted under 35 U.S.C. 154(b) by 1112 days.

(21) Appl. No.: 11/899,119

(22) Filed: Sep. 4, 2007

(65) Prior Publication Data

US 2009/0072101 A1 Mar. 19, 2009

Related U.S. Application Data

(63) Continuation-in-part of application No. 10/518,978, filed as application No. PCT/NL03/000452 on Jun. 19, 2003, now abandoned.

(30) Foreign Application Priority Data

Jun. 21, 2002 (NL) .................................. 1020916
Oct. 23, 2002 (NL) .................................. 1021732

(51) Int. Cl.
*F16H 27/02* (2006.01)
*F16M 11/26* (2006.01)
*B60P 1/14* (2006.01)

(52) U.S. Cl. ..................... 74/89.21; 248/188.5; 254/4 R

(58) Field of Classification Search .................. 248/159, 248/161, 162.1, 404, 599, 188.5; 108/147.19; 74/89.2, 89.21; 254/358, 372, 335, 336, 254/337, 338; 242/4 R, 390.2, 390.8, 390.9
See application file for complete search history.

(56) References Cited

U.S. PATENT DOCUMENTS

| 91,103 A | 6/1869 | Dungan |
| 3,396,601 A | 8/1968 | Wright |
| 4,667,605 A | 5/1987 | Bastian |
| 5,275,064 A * | 1/1994 | Hobbs ........................... 74/110 |
| 5,460,059 A | 10/1995 | Kato |
| 5,528,948 A | 6/1996 | De Gelis |
| 5,787,700 A | 8/1998 | Tanaka |
| 6,199,490 B1 | 3/2001 | Langer |
| 2002/0108544 A1 | 8/2002 | Hsu |
| 2006/0156837 A1 | 7/2006 | Stoelinga |

FOREIGN PATENT DOCUMENTS

| DE | 19749494 A1 | 5/1999 |
| EP | 0685185 A2 | 12/1995 |
| NL | 1004916 C2 | 7/1998 |
| WO | 2004/012558 A1 | 2/2004 |

* cited by examiner

*Primary Examiner* — Thomas R Hannon
*Assistant Examiner* — Alan Waits
(74) *Attorney, Agent, or Firm* — The Webb Law Firm

(57) ABSTRACT

A drive for displacing and positioning at least two profile parts relative to each other, includes: a rotatable drive wheel, a motor coupled to a first profile part and to the drive wheel, a flexible material strip which is rigidly connected on at least one side to a second profile part, which material strip also engages on the drive wheel, and a guide for the flexible material strip connected in at least substantially stationary manner to the first profile part, wherein the distance between the guide and the drive wheel is greater than the distance between the point of engagement of the flexible material strip on the second profile and the drive wheel. The invention also includes a length-adjustable housing provided with the aforementioned drive and to an article of furniture, in the legs of which such drives are accommodated.

20 Claims, 2 Drawing Sheets

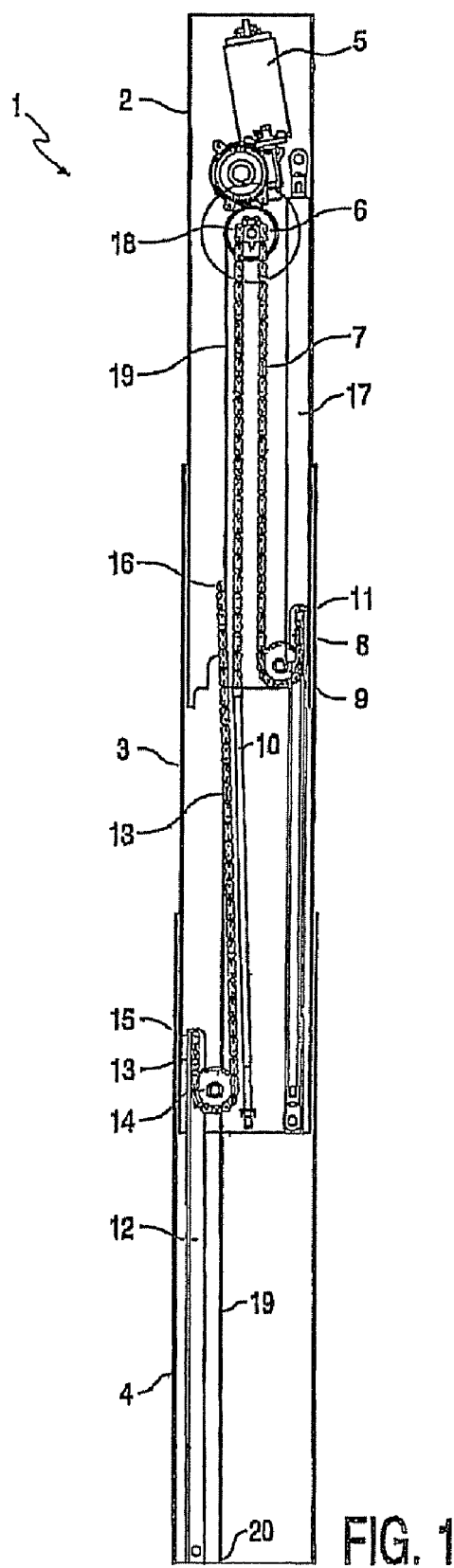
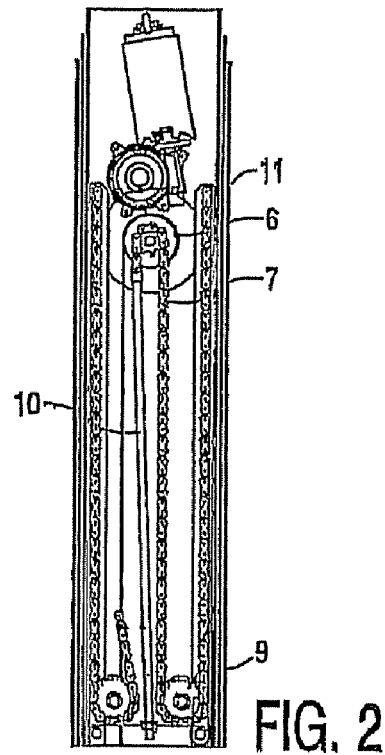
FIG. 1
FIG. 2

DRIVE FOR DISPLACING PROFILE PARTS RELATIVE TO EACH OTHER VIA A FLEXIBLE MATERIAL STRIP, LENGTH-ADJUSTABLE HOUSING AND ARTICLE OF FURNITURE

CROSS REFERENCE TO RELATED APPLICATIONS

This application is a continuation-in-part application of U.S. patent application Ser. No. 10/518,978, filed Sep. 8, 2005, and entitled "Drive for Displacing Profile Parts Relative to Each Other Via a Flexible Material Strip, Length-Adjustable Housing and Article of Furniture," the contents of which are incorporated herein by reference, which was the National Stage of International Application No. PCT/NL2004/000452, filed Jun. 19, 2003, under 35 U.S.C. §371.

BACKGROUND OF THE INVENTION

1. Field of the Invention

The invention relates to a drive for displacing and positioning at least two profile parts relative to each other. The invention also relates to a length-adjustable housing which is assembled from a plurality of relatively displaceable housing parts, and to an article of furniture of which such a housing forms part.

2. Description of Related Art

For the relative displacement of objects use is made in many applications of spindle/nut transmissions. A drawback of the existing systems is that generally they are relatively costly and heavy and have a complex construction. The existing spindle/nut transmissions also have a limited adjustment range.

SUMMARY OF THE INVENTION

The present invention therefore has for its object to provide an improved drive for relative displacement of profile parts with a simple and inexpensive construction, whereby a relatively large adjustment range can be realized.

The invention provides for this purpose a drive for displacing and positioning at least two profile parts relative to each other, comprising: a rotatable drive wheel, a drive member coupled to a first profile part and to the drive wheel, a flexible material strip which is rigidly connected on at least one side to a second profile part, which material strip also engages on the drive wheel, and a guide for the flexible material strip connected in at least substantially stationary manner to the first profile part, wherein the distance between the guide and the drive wheel is greater than the distance between the point of engagement of the flexible material strip on the second profile and the drive wheel.

The drive member can comprise either an electric motor or a drive shaft. The drive shaft can be connected to an electric motor being outside the drive. For example if several profile part have to be displaced relative to each other a common drive can be used which is connected to the drive through a drive shaft.

It is also possible that the drive shaft is embodied for manual operation such as a crank. Such a drive has the significant advantage over the prior art drives that the friction losses in the transmission are very low, whereby the motor can take a very light (and therefore compact and inexpensive) form. This makes it possible in more applications than heretofore to arrange the (electric) motor in the first profile part. An additional consequence of the relatively light construction is that the drive produces very little noise during use. This can be particularly advantageous in specific applications. Another advantage is that the drive according to the present invention allows great freedom in the design thereof. Subject to the application, a choice can thus be made in respect of the guiding (for instance a simple pin or an optionally mounted reversing wheel), the drive wheel and the flexible material strip (more on this below). A further significant advantage is that standard profile parts can be applied without having to undergo a particular processing on the inside. The complete drive can be manufactured at relatively low cost and, owing to the simple construction, is also little susceptible to malfunction.

For proper operation of the drive it is desirable that the drive wheel engages substantially without slip on the flexible material strip. In a preferred embodiment the drive wheel can be provided for this purpose with a toothing, and the flexible material strip can be provided with a profiling co-acting with the toothing of the drive wheel. Since the flexible material strip can only be engaged by the drive wheel over a part of the length, it is also possible for the flexible material strip to be assembled from successive segments with varying material properties. The part of the flexible material strip which engages with the drive wheel can for instance be formed by a chain or a toothed belt, while the part of the flexible material strip which does not engage with the drive wheel can take a less expensive form, for instance by opting for hoop-steel.

Since the invention requires that the distance between the point of engagement of the flexible material strip on the second profile and the drive wheel remains limited (at least that it is smaller than the distance between the guide and the drive wheel), it is necessary to arrange a provision for this purpose. One possible solution is that the flexible material strip is connected for this purpose to a protruding element rigidly connected to the second profile part. This protruding element herein has to reach in the direction of the drive wheel. The drive can itself be wholly concealed from view when the second profile part engages round the first profile part and the protruding element connected to the second profile part is located in the internal space of the first profile part. An alternative is to provide the first profile part with a longitudinal slot, through which slot the point of engagement of the flexible material strip on the second profile can displace. This is however a less attractive solution than that with the protruding element located in the internal space of the first profile part.

The flexible material strip is preferably connected on two sides to the second profile part. With such a construction two profile parts can be extended as well as retracted in controlled manner. Irrespective of the rotation direction of the drive wheel a tensile force can after all be exerted on the flexible material strip. A further advantage is that the position of the flexible material strip is hereby fully determined.

In yet another preferred embodiment the second profile part is provided with an additional guide by which an additional flexible material strip connected on one side to the first profile part is guided, which strip is connected on the opposite side to a guide connected to the third profile part. The additional flexible material strip can herein be connected to a protruding element which is rigidly connected to the third profile part. The third profile part herein preferably engages round the first and the second profile part, and the protruding element connected to the third profile part is located in the internal space of the first profile part. With such an expansion of the drive according to the invention it becomes possible to also displace a third profile part relative to the two other profile parts. A telescopic construction thus becomes possible with three (or even more than three) profile parts extendable and retractable relative to each other. The third profile part as it were "goes along" with the displacement brought about between the first and second profile parts. No additional driving (motor) is required for this purpose; the motor which drives the displacement between the first and second profile parts will of course have to be dimensioned such that power remains available for the displacement of the third profile part. It is noted that the invention can be expanded still further with an nth profile part provided with an additional guide whereby an additional flexible material strip connected on one side to the first profile part (or a random other profile part up to and including the (n−1)th) is guided, which strip is connected on the opposite side to a guide connected to an (n+1)th profile part. In this way the number of segments of which a telescopic construction can consist can (theoretically) be extended infinitely.

In yet another preferred embodiment the drive wheel is also connected to a pulling element which can be wound up round a reel part assembled for this purpose with the drive wheel, such that when the profile parts are retracted the pulling element winds onto the reel part. With such a pulling element, for instance a cable, cord or rope, the outermost profile part on the side remote from the first profile part can be pulled in controlled manner to the first profile part. The consequence hereof is that, irrespective of the number of assembled profile parts, the total length of the construction of assembled profile parts can always be controlled.

In order to increase the stability when moving the profile parts apart, it is also possible for the drive to comprise two flexible material strips which are rigidly connected on at least one side to a second profile part, which material strips also engage on the drive wheel, and two guides for the flexible material strips connected in stationary manner to the first profile part. It will be apparent that other components of the drive according to the present invention can also take a multiple form (twice as many or an even greater multiple) so as to increase the convenience of use, the stability and/or the reliability of the construction.

The invention also provides a length-adjustable housing which is assembled from a plurality of relatively displaceable housing parts, with a first housing part to which are connected the motor, the drive wheel and the guide of the drive according to any of the foregoing claims, and at least a second housing part with engaging position for the flexible material strip. It is found to be particularly advantageous in practice when the housing forms a telescopic leg. Such a housing, or leg, has the advantages as stated above with reference to the drive according to the invention. Such a leg built up of at least two relatively displaceable leg parts can take a compact (slender) form, while the leg can still also be used for applications in which an object for supporting (such as for instance a worktop) must be adjustable over a great range. An example of such an application is a workplace where it must be possible to carry out work as required in standing or sitting position.

For a simple operation of the drive, the housing can be provided with operating means for activating a motor connected to the drive. A control panel connected to the housing can be envisaged here, or an optionally wireless control panel for placing remotely of the housing. Alternatively or additionally, it is also possible for the housing to be provided with a control member with which the drive wheel can be rotated manually.

Finally, the present invention also provides an article of furniture provided with a plurality of legs in the form of housings as described in the foregoing paragraphs, wherein the drive wheels in the separate legs are driven by a central motor. Using a single motor a synchronized driving is thus possible of all legs supporting a table (or of course another article of furniture).

Still other desirable features of the invention will become apparent to those of ordinary skill in the art upon reading and understanding the following detailed description, taken with the accompanying drawings, wherein like reference numerals represent like elements throughout.

BRIEF DESCRIPTION OF THE DRAWINGS

FIG. 1 shows a side view of a cut-away telescopic leg of three profile parts in an extended situation with a drive according to the invention;

FIG. 2 shows a side view of the leg of FIG. 1 in a retracted situation;

DESCRIPTION OF THE PREFERRED EMBODIMENTS

Figure 3:
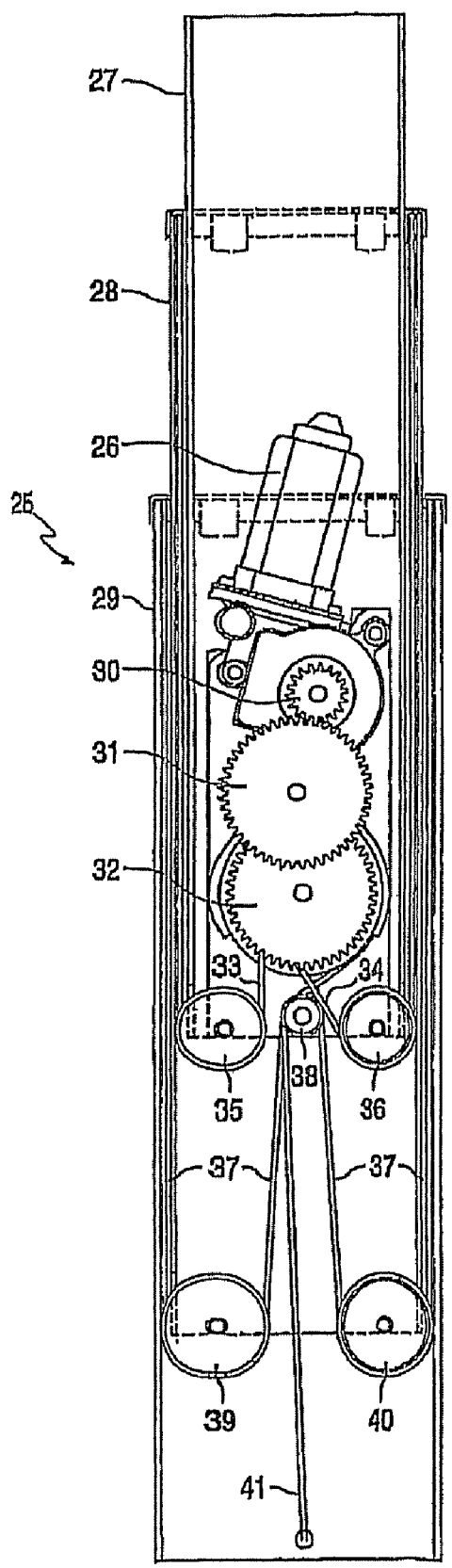
FIG. 3 shows a profile assembly with an electric motor connected to an upper profile part.

The present invention will now be described with reference to the accompanying figures. It is to be understood that the specific system illustrated in the attached figures and described in the following specification is simply an exemplary embodiment of the present invention.

FIG. 1 shows a leg 1 assembled from three telescopically co-acting profile parts 2, 3, 4. In a first profile part 2 is arranged an electric motor 5 to which is coupled a drive wheel 6 likewise connected to first profile part 2. Drive wheel 6 engages on a chain 7 which forms a flexible material strip with which the relative displacement of the first and second profile parts 2, 3 can be realized.

It should be realized that in stead of an electric motor 5 a drive shaft can be provided either for manual operation or operation through a further electric motor outside the leg of FIG. 1 for example an electric motor being in common for several legs.

On one side the chain 7 is connected to an upright 8 which is fixedly connected to second profile part 3. Upright 8 protrudes into the interior of first profile part 2 (particularly when leg 1 is retracted, see also FIG. 2). A guide wheel 9 for chain 7 is connected rotatably to first profile part 2. The side of the chain 7 remote from upright 8 is likewise fixedly connected to second profile part 3 via a rod 10. The relative position of the first two profile parts 2, 3 is mutually adjustable by rotating drive wheel 6 (for a better understanding see also FIG. 2 in combination with FIG. 1). The first profile part 2 remains in position relative to second profile part 3 in the case of a downward load when the electric motor 5 is not operating, because chain 7 engages at a position 11 which, relative to guide wheel 9, is located on the side of drive wheel 6 (above); the part of the chain 7 adjoining fixing position 11 is hereby placed under strain of tension.

A third profile part 4 is also provided with an internal upright 12 onto which a chain 13 engages. Chain 13 is trained from the engaging position 15 on upright 12 along a guide wheel 14, which is rotatably connected to the second profile part 3, to an engaging position 16 on first profile part 2. When the first and second profile parts 2, 3 are now moved apart, chain 13 runs along guide wheel 14 which herein rotates counter-clockwise. The result hereof is that the fixing position 15 of chain 13 on upright 12 is pulled to the guide wheel 14, with the consequence that the third profile part 4 is urged out of second profile part 3 (this can be compared to the displacement of the fixing position 11 of chain 7 in the direction of guide wheel 9). A separate drive for the relative displacement of second and third profile parts 3, 4 is therefore unnecessary. It is noted that a construction such as between the second and third profile parts 3, 4 can also be applied as required for subsequent profile parts (not shown).

In order to reduce the force required in extending the leg 1, a compression spring 17 is also placed between the first and second profile parts 2, 3. Moving apart will after all generally take place counter to the force of gravity, and therefore requires a greater effort than shortening the leg length using the force of gravity. The size of the electric motor 5 can be further limited by applying compression spring 17.

Drive wheel 6 is also provided with a reel 18 onto which a cable 19 is wound when the total leg length is reduced. Cable 19 is fixed at an anchoring position 20 to the third profile part 4 so that, when the leg length is reduced, the maximum distance of third profile part 4 from first profile part 2 is bounded by the length of cable 19 not wound onto reel 18.

FIG. 2 shows the leg 1, but now in a retracted situation. For a description of the individual components reference is made to the description associated with FIG. 1. Relevant changed relative positions are, among others, the fixing position 11 of chain 7, which is further removed from guide wheel 9. Owing to tensile strain on the end of chain 7 adjoining rod 10 (the distance between drive wheel 6 and rod 10 is reduced relative to the situation shown in FIG. 1), the first and second profile parts 2, 3 are telescoped together. The fixing position 15 of chain 13 is also further removed from guide wheel 14 than in the above shown situation; third profile part 4 is also retracted.

Figure 4:
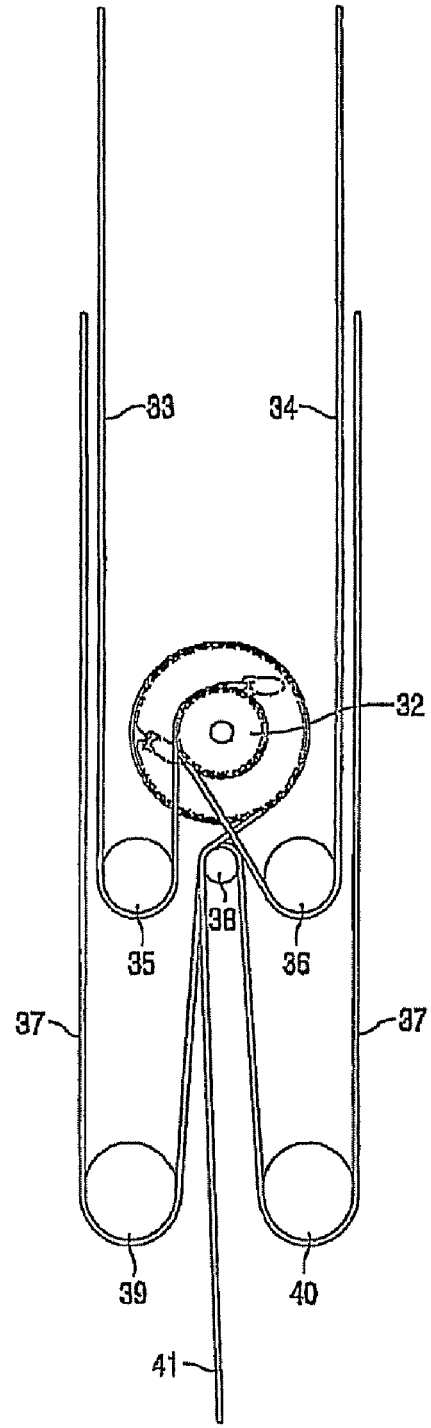
FIG. 4 shows a view of cables that form a part of the profile assembly shown in FIG. 3.

FIG. 3 shows a profile assembly 25 with an electric motor 26 which is connected to an upper profile part 27. This latter is slidable in a middle profile part 28 which is in turn displaceable in a lower profile part 29. A drive wheel 30 is driven rotatably by electric motor 26. Via a transmission wheel 31 the rotation of drive wheel 30 is transferred to a reel 32. Other than the reel 18 shown in FIGS. 1 and 2, the reel 32 shown in FIG. 3 is provided with two cables 33, 34 (instead of one) which are trained along two guide wheels 35, 36 which are connected rotatably to first profile part 27. From guide wheels 35, 36 the cables 33, 34 then lead to two engaging positions (not shown) on the top side of the middle profile part 28. FIG. 4 shows for the sake of clarity a view of cables 33, 34 such as form part of the profile assembly shown in FIG. 3, in which can be seen how far the cables 33, 34 reach.

During the relative displacement of the upper and middle profile parts 27, 28 the lower profile part 29 is also displaced by means of cable 37 relative to upper and middle profile parts 27, 28. For this purpose the cable 37 is trained along a guide 38 which is connected to upper profile part 27, and along two guide wheels 39, 40 which are mounted rotatably on middle profile part 28. Cable 37 then engages on either side at a fixed position on the top side of lower profile part 29 (see FIG. 4 once again for elucidation). As the distance between guide wheels 35, 36 and guide 38 increases (sliding out of first profile part 27 relative to second profile part 28), the additional length of cable 37 required for this purpose between these guide elements 35, 36, 38 will result in the top part of the lower profile part 29 being pulled downward. The lower profile part 29 is hereby displaced relative to the middle profile part 28; they also slide apart.

Finally, FIGS. 3 and 4 further show a cable 41 which is wound onto reel 32 in opposite direction to cables 33, 34. Cable 41 is anchored to the lower profile part 29 on the side remote from reel 32 (after being trained shortly along guide 38). This cable 41 is arranged for controlled retraction of profile parts 27, 28, 29. When reel 32 is rotated in a direction opposite to that described above during extending of profile parts 27, 28, 29, the cable 41 will exert a tensile force with which the upper profile part 27 and lower profile part 29 are moved toward each other, therein carrying along the middle profile part 28. An important difference between the leg 1 shown in FIGS. 1 and 2 and the profile assembly 25 is that in the profile assembly the mechanism for extending profile parts 27, 28, 29 takes a dual form, which results in a construction which is more stable relative to the above discussed embodiment variant and can operate with less resistance.

The invention has been described with reference to the desirable embodiments. Modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A drive for displacing and positioning at least two profile parts relative to each other, comprising:
    a rotatable drive wheel;
    a drive member coupled to a first profile part and to the drive wheel;
    a flexible material strip rigidly connected to a point of engagement on at least one side to a second profile part, wherein the flexible material strip engages the drive wheel; and
    a guide for the flexible material strip, wherein the guide is connected to the first profile part,
    wherein the distance between the guide and the drive wheel is greater than the distance between the point of engagement of the flexible material strip on the second profile and the drive wheel, and wherein the drive wheel is connected to a pulling element adapted to be wound around a reel part provided on the drive wheel such that, when the at least two profile parts are retracted by engaging the drive wheel on the flexible material strip, the pulling element winds onto the reel part.

2. The drive as claimed in claim 1, wherein the drive engages substantially without slip on the flexible material strip.

3. The drive as claimed in claim 1, wherein the drive wheel is provided with teeth.

4. The drive as claimed in claim 3, wherein the second profile part is provided with an additional guide, whereby an additional flexible material strip connected on one side to the first profile part is guided, wherein the additional flexible material strip is connected on an opposite side to a guide connected to the third profile part.

5. The drive as claimed in claim 1, wherein at least a part of the flexible material strip is formed by hoop-steel.

6. The drive as claimed in claim 1, wherein the flexible material strip is connected to a protruding element rigidly connected to the second profile part.

7. The drive as claimed in claim 6, wherein the second profile part engages around the first profile part and the protruding element connected to the second profile part is located in the internal space of the first profile part.

8. The drive as claimed in claim 7, wherein an additional flexible material strip is connected to a protruding element, wherein the protruding element is rigidly connected to the third profile part.

9. The drive as claimed in claim 8, wherein the third profile part engages around the first and the second profile parts, and the protruding element connected to the third profile part is located in the internal space of the first profile part.

10. The drive as claimed in claim 1, wherein the drive member comprises an electric motor.

11. The drive as claimed in claim 1, wherein the drive member comprises a handcrank.

12. The drive as claimed in claim 1, wherein the drive member comprises a drive shaft.

13. A length-adjustable housing assembled from a plurality of displaceable housing parts, with a first housing part having a drive connected thereto, wherein:

the drive is comprised of a rotatable drive wheel, a drive member coupled to the first housing part and to the drive wheel, a flexible material strip rigidly connected at a point of engagement on at least one side to a second housing part, wherein the material strip engages the drive wheel, and a guide for the flexible material strip is connected to the first housing part;

the distance between the guide and the drive wheel is greater than the distance between the point of engagement of the flexible material strip on the second housing part and the drive wheel; and the drive wheel is connected to a pulling element adapted to be wound around a reel part provided on the drive wheel such that, when the at least two housing parts are retracted by engaging the drive wheel on the flexible material strip, the pulling element winds onto the reel part.

14. The housing as claimed in claim 13, wherein the housing forms a telescopic leg.

15. The drive as claimed in claim 13, wherein the drive member comprises an electric motor.

16. The housing as claimed in claim 15, wherein the housing is provided with operating means for activating the motor.

17. The drive as claimed in claim 13, wherein the drive member comprises a hand crank.

18. The drive as claimed in claim 13, wherein the drive member comprises a drive shaft.

19. An article of furniture provided with a plurality of legs in the form of housing parts, with a first housing part and a drive connected thereto, wherein:

the drive is comprised of a rotatable drive wheel, a drive member coupled to the first housing part and to the drive wheel, a flexible material strip rigidly connected at a point of engagement on at least one side to a second housing part, wherein the material strip engages the drive wheel, and a guide for the flexible material strip connected to the first leg;

the distance between the guide and the drive wheel is greater than the distance between the point of engagement of the flexible material strip an the second housing part and the drive wheel;

a plurality of drive wheels is driven synchronously, and the drive wheel is connected to a pulling element adapted to be wound around a reel part provided the drive wheel such that, when the at least two housing parts are retracted by engaging the drive wheel on the flexible material strip, the pulling element winds onto the reel part.

20. The article as claimed in claim 19, wherein the plurality of drive wheels in separate legs are driven by a central motor.

\* \* \* \* \*